United States Patent [19]

Brewer et al.

[11] Patent Number: 5,303,883
[45] Date of Patent: Apr. 19, 1994

[54] GLIDING DECELERATOR INCLUDING AN ASSEMBLY FOR IMPROVING THE LIFT TO DRAG RATIO ASSOCIATED THEREWITH

[75] Inventors: John C. Brewer, Norfolk; James E. Sadeck, East Freetown, both of Mass.

[73] Assignee: The United States of America as represented by the Secretary of the Army, Washington, D.C.

[21] Appl. No.: 94,671

[22] Filed: Jul. 16, 1993

[51] Int. Cl.⁵ .................................... B64D 17/02
[52] U.S. Cl. ........................... 244/145; 244/142
[58] Field of Search .............. 244/145, 142, 153 R, 244/900, 902, 154, 146

[56] References Cited

U.S. PATENT DOCUMENTS

| | | | |
|---|---|---|---|
| Re. 31,205 | 4/1983 | Jalbert | 244/145 |
| 3,620,486 | 11/1971 | Charpentier et al. | 244/33 |
| 3,724,789 | 4/1973 | Snyder | 244/145 |
| 3,756,547 | 9/1973 | Snyder et al. | 244/152 |
| 3,944,169 | 3/1976 | Bede | 244/142 |
| 4,191,349 | 3/1980 | Pravaz | 244/145 |
| 4,363,458 | 12/1982 | Jones et al. | 244/153 R |
| 4,406,433 | 9/1983 | Radkey et al. | 244/145 |
| 4,470,567 | 9/1984 | Puskas | 244/145 |
| 4,562,981 | 1/1986 | Smith et al. | 244/145 |
| 4,623,109 | 11/1986 | Sadeck | 244/152 |
| 4,722,498 | 2/1988 | Cameron | 244/153 R |
| 4,811,920 | 3/1989 | Askwith et al. | 244/145 |
| 5,028,018 | 7/1991 | Krebber | 244/146 |
| 5,058,831 | 10/1991 | Takahashi | 244/142 |
| 5,169,092 | 12/1992 | Murakami | 244/145 |
| 5,244,169 | 9/1993 | Brown et al. | 244/146 |

FOREIGN PATENT DOCUMENTS

| | | | |
|---|---|---|---|
| 0129026 | 12/1984 | European Pat. Off. | 244/145 |
| 0442513 | 8/1991 | European Pat. Off. | 244/145 |
| 2614265 | 10/1988 | France | 244/145 |

Primary Examiner—Michael S. Huppert
Assistant Examiner—Anne E. Bidwell
Attorney, Agent, or Firm—Richard J. Donahue; Anthony T. Lane

[57] ABSTRACT

A gliding decelerator and an assembly for use therein for improving the lift to drag ratio associated therewith. In a preferred embodiment, the gliding decelerator includes a ram-air canopy shaped to include a plurality of half-cells, each half-cell having an open leading end and a closed tailing end. Inflatable bladders are secured within the respective half-cells of the canopy, the inflatable bladders being appropriately dimensioned so that, when inflated soon after the canopy has been opened, each bladder fills its respective half-cell in such a way as to stiffen the half-cell both along its length and at its open leading end. The inflatable bladders may be inflated simultaneously or in stages, the inflation means comprising a gas source, a flexible manifold connecting the gas source to the half-cells and valve means for controlling the output of the gas source. Control of the valve means may be automatic, e.g., a timer, a remote control unit, or may be controlled by a parachutist, e.g., completion of an electric circuit. The inflation means may be mounted within the wing-shaped canopy or may be externally mounted.

10 Claims, 5 Drawing Sheets

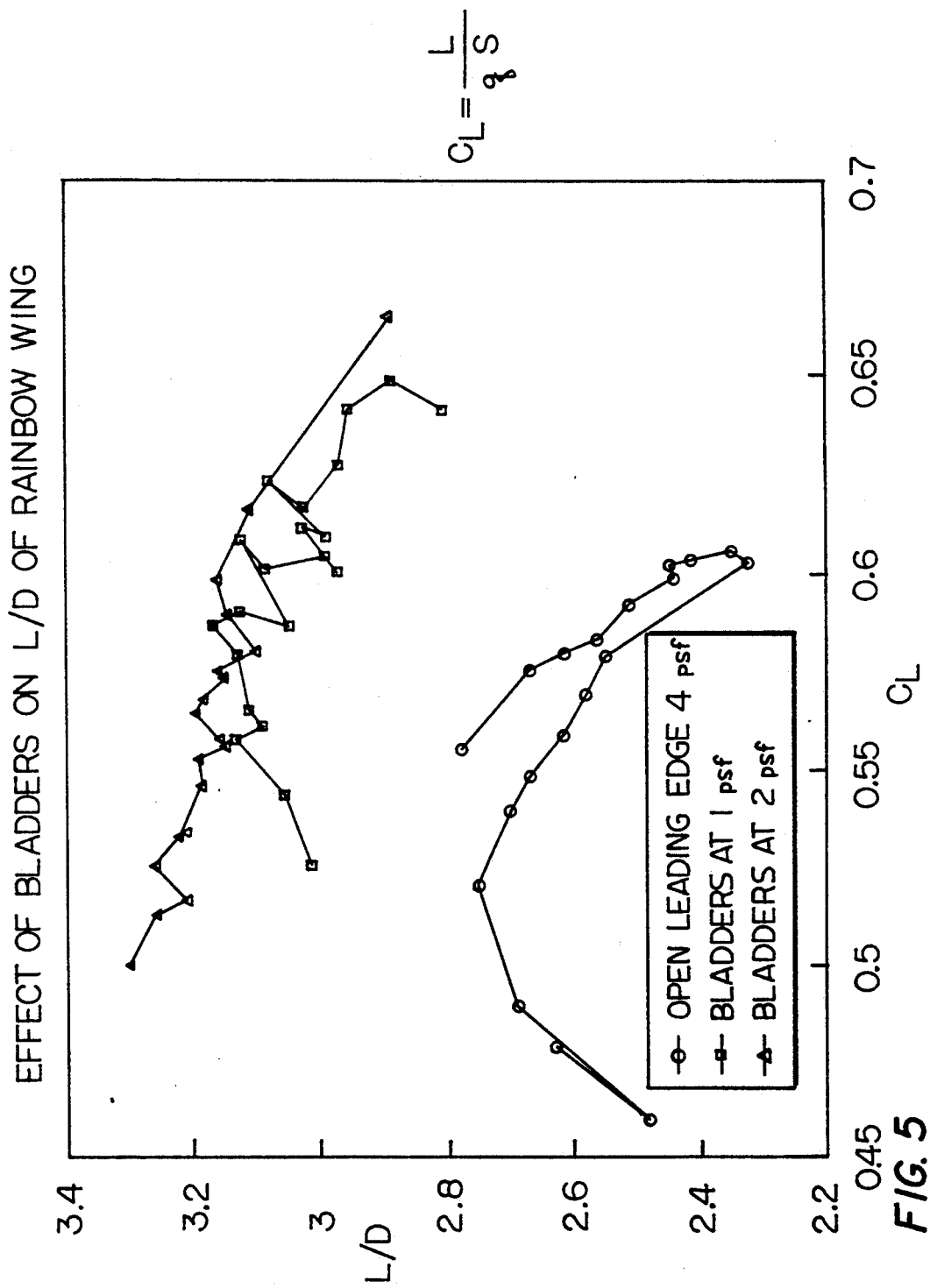

GLIDING DECELERATOR INCLUDING AN ASSEMBLY FOR IMPROVING THE LIFT TO DRAG RATIO ASSOCIATED THEREWITH

The invention described herein may be manufactured, used and licensed by or for the Government for Governmental purposes without the payment to us of any royalty thereon.

BACKGROUND OF THE INVENTION

The present invention relates generally to gliding decelerators and more particularly to a new and novel gliding decelerator which includes an assembly for improving the lift to drag ratio associated therewith.

It has been found desirable to airdrop military personnel, supplies and equipment from as great a horizontal distance as possible from the ground impact point in order to reduce vulnerability of the delivery aircraft to ground fire and to increase uncertainty on the part of the enemy as to the location of the landing point. One approach which has been used in furtherance of this objective is to airdrop troops and/or cargo using gliding decelerators (i.e. parachutes). Gliding decelerators typically have a hollow, wing-shaped canopy which, after deployment, stiffens to facilitate gliding over a horizontal distance.

One type of hollow, wing-shaped canopy commonly used in gliding decelerators is known as a ram-air type canopy. Such a canopy typically consists of a plurality of elongated, chord-shaped, sections which are sewn together in a side-by-side arrangement. The sections are hollow, with the respective leading ends thereof being open and the respective tailing ends thereof being closed so that, in the course of the opening of the canopy and the descent, air enters through the leading ends of the sections and inflates the sections, thereby opening the canopy and imparting some stiffness thereto for gliding. Suspension lines are either typically attached to the canopy along the seams of every other section, in which case the sections are referred to as "half-cells," or are attached to the canopy along the seams of each section, in which case the sections are referred to as "cells." For purposes of the present specification and claims, the terms "half-cells" and "cells," when used to refer to these sections of a canopy, will be used interchangeably and synonymously.

Examples of gliding decelerators having ram-air type canopies are disclosed in the following U.S. patents: U.S. Pat. No. 5,169,092, inventor Murakami, issued Dec. 8, 1992; U.S. Pat. No. 4,811,920, inventors Askwith et al., issued Mar. 14, 1989; U.S. Pat. No. 4,470,567, inventor Puskas, issued Sep. 11, 1984; U.S. Pat. No. 4,406,433, inventors Radkey et al., issued Sep. 27, 1983; U.S. Pat. No. Re. 31,205, inventor Jalbert, reissued Apr. 12, 1983; U.S. Pat. No. 4,191,349, inventor Pravaz, issued Mar. 4, 1980; and U.S. Pat. No. 3,724,789, inventor Snyder, issued Apr. 3, 1973.

Other patents of interest include U.S. Pat. No. 5,058,831, inventor Takahashi, issued Oct. 22, 1991; U.S. Pat. No. 4,722,498, inventor Cameron, issued Feb. 2, 1988; U.S. Pat. No. 4,363,458, inventors Jones et al., issued Dec. 14, 1982; and U.S. Pat. No. 3,620,486, inventors Charpentler et al., issued Nov. 16, 1971.

The efficiency with which a canopy glides through the air is largely affected by its lift to drag ratio (L/D). One problem experienced by many wing-shaped canopies, and particularly by ram-air type canopies, is a greater than desired drag. A considerable amount of drag in ram-air type canopies can be traced to their open-leading edge and to a lack of stiffness in the canopies after they have been fully opened. This lack of stiffness, which results in fabric flutter, is caused by fluctuations in the ram-air dynamic pressure needed to maintain the shape of the open leading edge and the half-cells of the canopy as the opened canopy glides through the air. Drag is also caused by the suspension lines used to attach the payload to the canopy.

SUMMARY OF THE INVENTION

It is an object of the present invention to provide a new and novel gliding decelerator.

It is another object of the present invention to provide a gliding decelerator as described above which exhibits an improved lift to drag ratio as compared to comparable existing gliding decelerators.

In accordance with the objects set forth broadly above and hereinafter made apparent, a new and novel gliding decelerator constructed according to the teachings of the present invention broadly comprises (a) a wing-shaped canopy, said wing-shaped canopy being shaped to include an elongated hollow chamber; and (b) an assembly for improving the lift to drag ratio associated with said wing-shaped canopy, said assembly including (i) an inflatable bladder disposed within said chamber and being appropriately dimensioned so that, when inflated, it occupies said chamber in such a way as to provide some stiffening to said wing-shaped canopy; and (ii) means for inflating said inflatable bladder.

In a preferred embodiment of the invention, the above-described wing-shaped canopy is a ram-air canopy having a plurality of elongated, hollow half-cells, each half-cell being open at its respective leading end and closed at its respective closed end. An inflatable bladder is secured within each half-cell, the inflatable bladder being appropriately dimensioned so that, when inflated, it fills its respective half-cell in such a way as to stiffen the half-cell both along its length and at its open leading end. The inflatable bladders may be inflated simultaneously or in stages, the inflation means comprising a gas source, a flexible manifold connecting the gas source to the half-cells and valve means for controlling the output of the gas source. Control of the valve means may be automatic, e.g., a timer, a remote control unit, or may be controlled by a parachutist, e.g., completion of an electric circuit. The inflation means may be mounted within the wing-shaped canopy or may be externally mounted. The inflation could occur after nominal canopy opening so as to avoid intensifying the opening shock. Means of deflation might also be provided.

In addition to being directed to a gliding decelerator, the present invention is also directed to the above-described assembly for improving the lift to drag ratio associated with the wing-shaped canopy of a gliding decelerator.

One highly desirable attribute or advantage associated with the above-described assembly is the assembly's capacity to be used or retrofitted with many existing conventional gliding decelerators. Since the assembly is not essential to normal operation of a conventional canopy, incorporation of the assembly into a conventional canopy would be inherently "fail-safe." That is, failure of the assembly to work would still leave a fully functional gliding decelerator.

Another highly desirable attribute or advantage associated with the above-described assembly is the fact that the assembly should pen-nit fewer suspension lines to be attached to the canopy and thus reduce the drag resulting from such suspension lines.

Additional objects, features and advantages of the present invention will appear from the description to follow. In the description, reference is made to the accompanying drawings which form a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals indicate like parts:

FIG. 5 is a graph of experimental wind-tunnel test data illustrating the effects of the present invention on the lift to drag ratio of a conventional gliding parachute having a ram-air canopy.

DETAILED DESCRIPTION OF PREFERRED EMBODIMENTS

Figure 1:
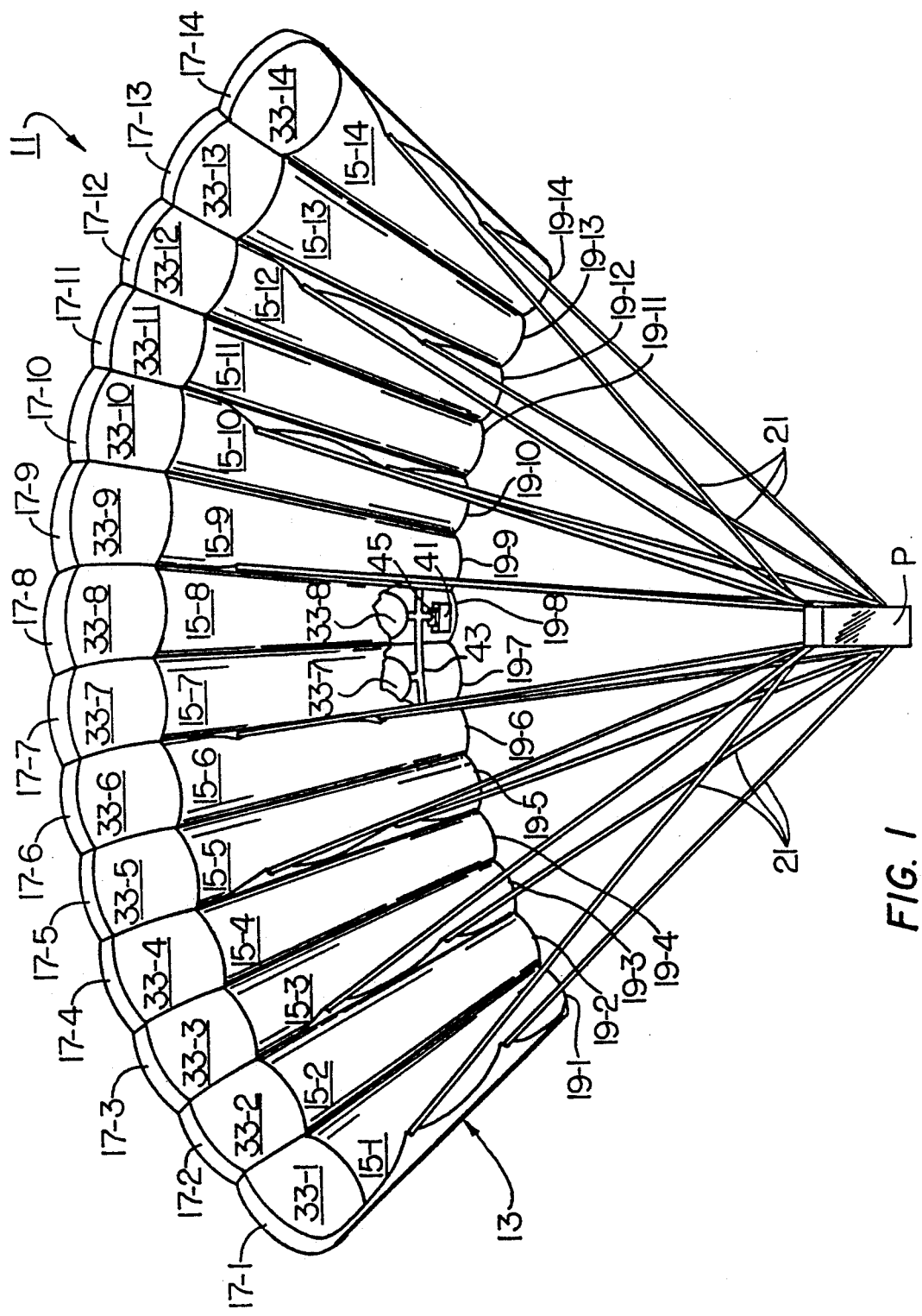
FIG. 1 is a perspective view, broken away in part, of one embodiment of a gliding decelerator constructed according to the teachings of the present invention.
Figure 2:
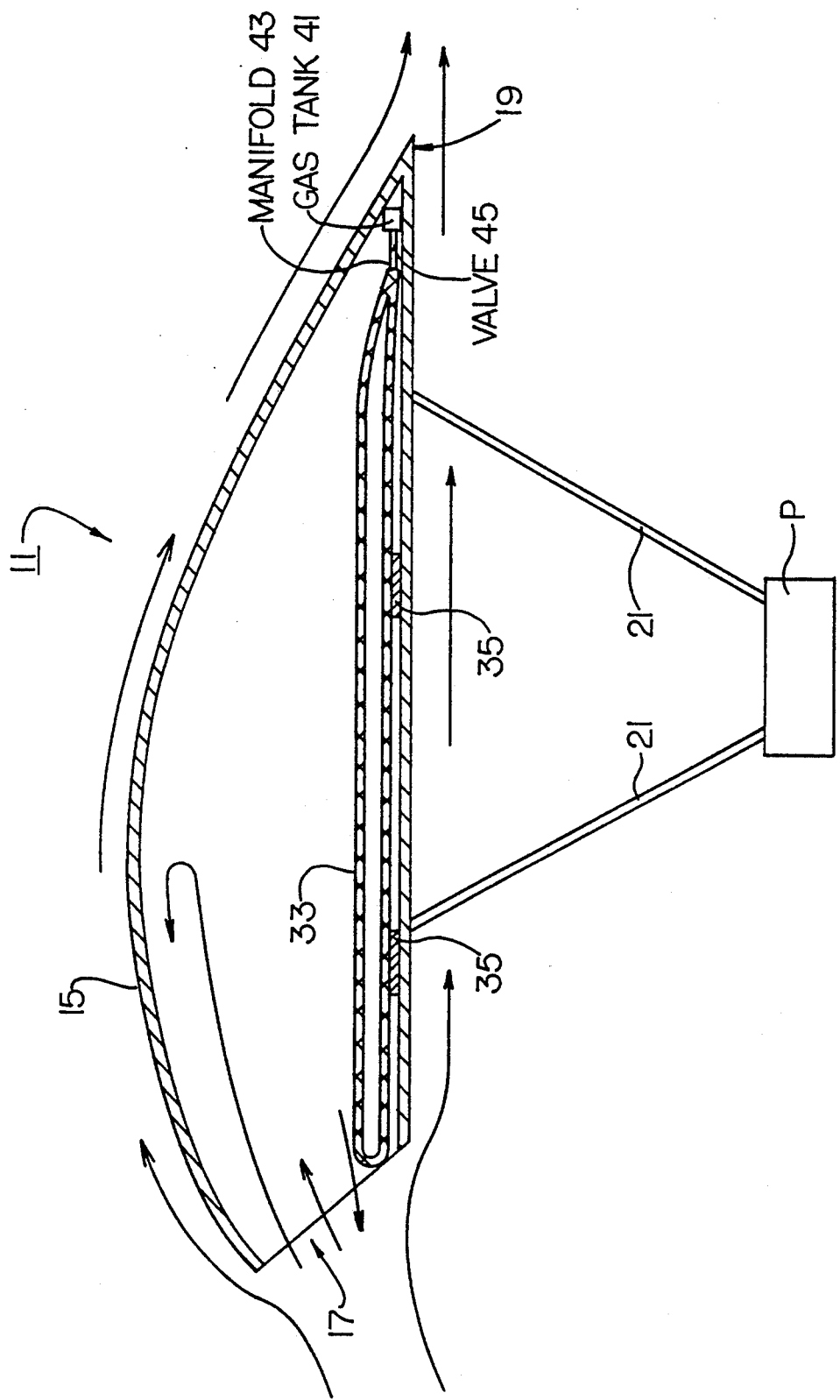
FIG. 2 is a schematic section view of the gliding decelerator shown in FIG. 1 prior to inflation of the inflatable bladders disposed within the ram-air canopy.
Figure 3:
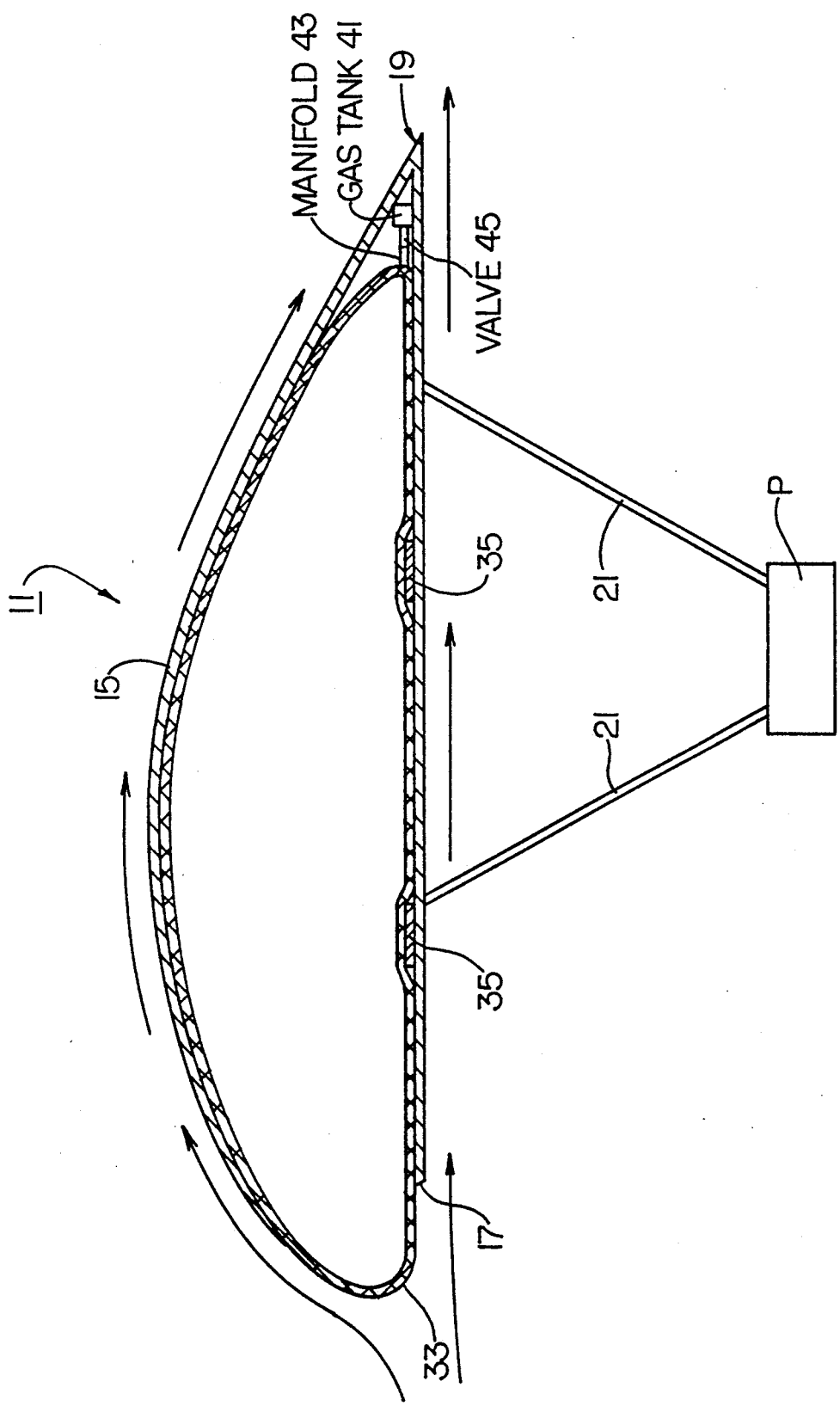
FIG. 3 is a schematic section view of the gliding decelerator shown in FIG. 1 after inflation of the inflatable bladders disposed within the ram-air canopy.

Referring now to FIGS. 1 through 3, there are shown various views of one embodiment of a gliding decelerator constructed according to the teachings of the present invention, the gliding decelerator being represented generally by reference numeral 11.

Decelerator 11 includes a ram-air canopy 13. Canopy 13, which may be an existing conventional ram-air canopy in size, shape and construction, can be seen to include a plurality of elongated, chord-shaped, hollow half-cells 15-1 through 15-14, each half-cell 15 having an open leading end 17 and a closed tailing end 19.

Suspension lines 21 are attached at one end to the longitudinal seams connecting every other half-cell and are adapted to be attached at their opposite end to a payload P.

For at least the reasons discussed above in great detail, canopy 13 has a less than optimal lift to drag ratio. Consequently, in accordance with the teachings of the present invention, gliding decelerator 11 also includes an assembly for improving the lift to drag ratio associated therewith.

Figure 4A:
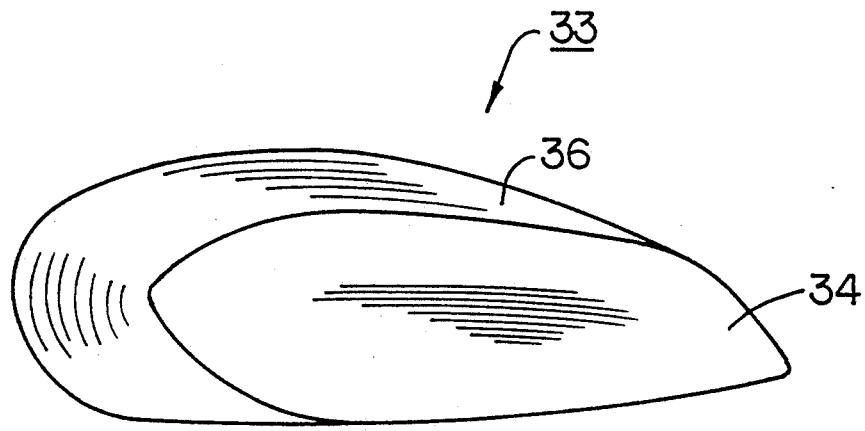
FIG. 4(a) is a three-dimensional view of one of the air-foil shaped bladders shown in FIG. 1.
Figure 4B:
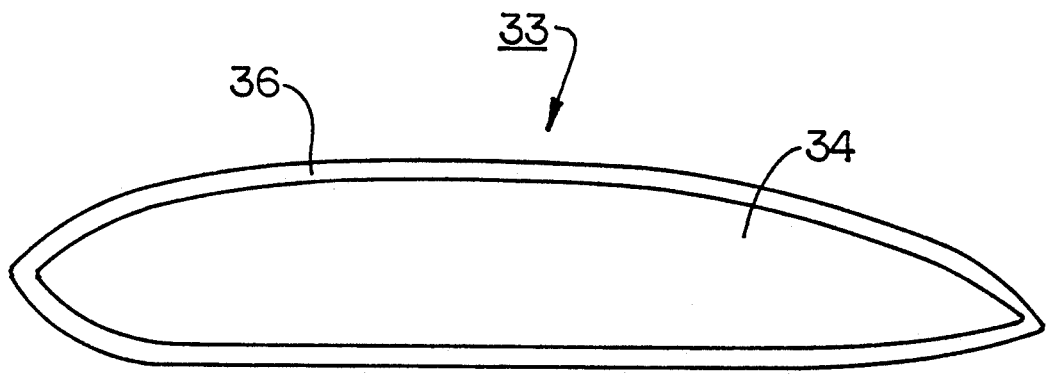
FIG. 4(b) is a two-dimensional view of the air-foil shaped bladder shown in FIG. 4(a)

The assembly of the present invention includes a plurality of inflatable bladders 33-1 through 33-14. (One such bladder 33 is shown in isolation in FIGS. 4(a) and (b). As can be seen, bladder 33 comprises a pair of similarly-shaped sections 34 joined together by a seam 36). Each bladder 33 is disposed within a respective half-cell 15 and is removably secured therein (preferably along the inner side wall of the half-cell but also possibly along the inner top wall or bottom wall thereof as shown) with one or more velcro strips 35 or the like. Alternatively, bladders 33 could be restrained within their respective half-cells by joining together the bladders of two or more half-cells through inter-cell vent holes. Bladders 33, which may be made of a lightweight material such as mylar, have a generally constant cross-section. Bladders 33 are shaped so that, when inflated, each bladder fills the space within its respective half-cell 15, with the front end of the bladder being rounded and extending partially out of the open leading end 17 of its half-cell 15. The rounded front end of the inflated bladder serves to significantly reduce drag over the leading end opening. (Approximately 40% of drag associated with ram-air canopies is caused by the open leading ends of the half-cells). The remainder of the bladders serve to stiffen the half-cells along their respective lengths. By stiffening the canopy, the bladders reduce drag from fabric flutter and allow a canopy specifically designed to receive the bladders to require fewer suspension lines, thus reducing the resultant drag from the suspension lines. In addition, the bladders are not porous and therefore reduce drag resulting from fabric porosity.

Each bladder may be equipped with a pressure relief valve (not shown) for averting overinflation and possible rupture of the bladder. The anticipated pressure level is expected to be in the range of 0.05 to 0.10 psi over atmospheric pressure. The valves could be cheap, simple, removable and therefore replaceable.

The assembly of the present invention also includes means for inflating bladders 33. In the embodiment shown, said means is mounted inside of canopy 13 near its tailing edge and includes a gas tank 41 containing compressed air, helium or the like, a flexible manifold 43 connected at its input end to tank 41 and at its output ends to the corresponding tailing ends of bladders 33, and a valve 45 for controlling the admission of gas from tank 41 to manifold 43. Valve 45 is preferably the type of valve which is controllable by remote control, by timer, by completion of an electric circuit by a parachutist or other similar means to permit initiation of inflation at an appropriate time after opening of the canopy.

Before deployment, canopy 13 is folded and rigged in the conventional manner, bladders 33 being deflated within their respective half-cells 15. To open canopy 13 during deployment, ram-air is used in the conventional manner (see FIG. 2). Once canopy 13 has been opened and the initial deceleration has occurred, bladders 33 are then inflated with the gas from tank 41.

Referring now to FIG. 5, there is shown a graph plotting L/D (lift over drag) versus $C_L$ (a wing's lift coefficient) for purposes of illustrating how bladders 33 can in fact unprove the lift to drag ratio of a gliding decelerator. As can be seen, the decelerators having bladders at 1 psf and at 2 psf clearly showed improved lift over drag ratios as compared to a decelerator having an open leading end and did so at lower dynamic pressures.

It should be understood that, instead of inflating bladders 33 simultaneously in the manner described above, said bladders could be arranged to be inflated in stages. It should also be understood that, instead of inflating bladders 33 with the means described above, gas generating pellets of the type used to inflate automotive safety airbags could be used.

The embodiments of the present invention are intended to be merely exemplary and those skilled in the art shall be able to make numerous variations and modifications to it without departing from the scope and spirit of the present invention. The above and other such variations and modifications are intended to be merely within the scope of the present invention as defined in the appended claims.

What is claimed is:

1. A gliding decelerator comprising:
   (a) a wing-shaped canopy, said wing-shaped canopy being shaped to include an elongated hollow chamber having an open leading end; and
   (b) an assembly for improving the lift to drag ratio associated with said wing-shaped canopy, said assembly including
      (i) an inflatable bladder disposed within said chamber and being appropriately dimensioned, when inflated, to occupy said chamber in such a way as to provide some stiffening to said wing-shaped canopy and form a rounded end which closes and extends partially out of the leading end of said hollow chamber; and
      (ii) an inflation mechanism for inflating said inflatable bladder.

2. The gliding decelerator as claimed in claim 1 wherein said inflation mechanism comprises a gas tank connected to said inflatable bladder and valve means for regulating the admission of gas into said inflatable bladder from said gas tank.

3. The gliding decelerator as claimed in claim 1 wherein said inflation mechanism is mounted within said wing-shaped canopy.

4. An assembly for stiffening a wing-shaped canopy of a gliding decelerator, the wing-shaped canopy including an elongated hollow chamber having an open leading end, said assembly comprising:
   (a) an inflatable bladder disposed within said elongated hollow chamber and being appropriately dimensioned, when inflated, to occupy said elongated hollow chamber in such a way as to provide some stiffening to the wing-shaped canopy and form a rounded end which closes and extends partially out of the leading end said hollow chamber; and
   (b) an inflation mechanism for inflating said inflatable bladder.

5. The assembly as claimed in claim 4 wherein said inflation mechanism comprises a gas tank connected to said inflatable bladder and valve means for regulating the admission of gas into said inflatable bladder from said gas tank.

6. The assembly as claimed in claim 5 wherein said valve means is automatically actuable to open at an appropriate time after said wing-shaped canopy has opened.

7. A gliding decelerator comprising:
   (a) a ram-air canopy, said ram-air canopy being shaped to include a plurality of elongated half-cells, each of said elongated half-cells having an open leading end and a closed tailing end; and
   (b) an assembly for improving the lift to drag ratio associated with said ram-air canopy, said assembly including
      (i) a plurality of inflatable bladders, each of said inflatable bladders being disposed within one of said half-cells and being appropriately dimensioned, when inflated, to occupy its respective half-cell in such a way as to provide some stiffening to said ram-air canopy, each of said inflatable bladders, when inflated, including a rounded front end shaped to fill and to extend partially out of its respective half-cell; and
      (ii) an inflation mechanism for inflating said plurality of inflatable bladders.

8. The gliding decelerator as claimed in claim 7 wherein each of said inflatable bladders dimensioned, when inflated, to occupy substantially the length of its respective half-cell.

9. The gliding decelerator as claimed in claim 7 wherein said inflation mechanism comprises a gas tank, a flexible manifold for connecting said gas tank to said plurality of inflatable bladders and valve means for regulating the release of gas from said gas tank.

10. The gliding decelerator as claimed in claim 9 wherein said gas tank, said flexible manifold and said valve means are disposed within said ram-air canopy.

* * * * *